United States Patent [19]

Parnigoni

[11] Patent Number: 4,879,084
[45] Date of Patent: Nov. 7, 1989

[54] METHOD OF FORMING A NET-LIKE STRUCTURE

[76] Inventor: Rudolf Parnigoni, 62, Boul. Du Domaine, Ile Perrot, Quebec, Canada, J7V 5V6

[21] Appl. No.: 533,789

[22] Filed: Sep. 19, 1983

Related U.S. Application Data

[63] Continuation-in-part of Ser. No. 357,721, Mar. 12, 1982, abandoned, which is a continuation-in-part of Ser. No. 250,863, Apr. 3, 1981, abandoned.

[51] Int. Cl.$^4$ .................. B29C 53/04; B21D 31/04
[52] U.S. Cl. .......................................... 264/295; 29/6.1; 29/169.5; 264/339; 264/DIG. 81
[58] Field of Search .............. 264/145, 154, 339, 295, 264/284, DIG. 81; 29/6.1, 169.5

[56] References Cited

U.S. PATENT DOCUMENTS

| 3,080,579 | 3/1963 | Gordon | 264/154 |
| 3,346,246 | 10/1967 | Loetel et al. | 264/154 |
| 3,497,928 | 3/1970 | Coen | 29/6.1 |
| 3,642,967 | 2/1972 | Doll | 264/147 |
| 3,756,300 | 9/1973 | Nalle, Jr. | 264/DIG. 81 |
| 3,839,525 | 10/1974 | Doll | 264/154 |
| 3,900,550 | 8/1975 | Oliver | 264/339 |
| 3,950,474 | 4/1976 | Cunningham | 264/DIG. 81 |
| 3,966,044 | 6/1976 | Cunningham | 264/145 |
| 4,105,724 | 8/1978 | Talbot | 264/154 |
| 4,303,714 | 12/1981 | Mercer | 264/288.8 |

Primary Examiner—James Lowe
Attorney, Agent, or Firm—Samuel Meerkreebs

[57] ABSTRACT

A method is disclosed for forming a net-like structure from a suitable material, such as metal or a synthetic polymer. The structure avoids the problems of low tear strength at the joints in the mesh and enables novel shapes and designs to be formed that are not possible to make by other methods. The method comprises the steps of forming a planar web from a suitable material in a plastic state, the forming providing for the planar web to have a substantially flat parting plane, the planar web having an expandable pattern of strands and strand joints with apertures therebetween, and expanding the planar web by forcing the exterior and interior of the web apart in a direction generally perpendicular to the planar web, to form a three-dimensional net-like structure.

15 Claims, 14 Drawing Sheets

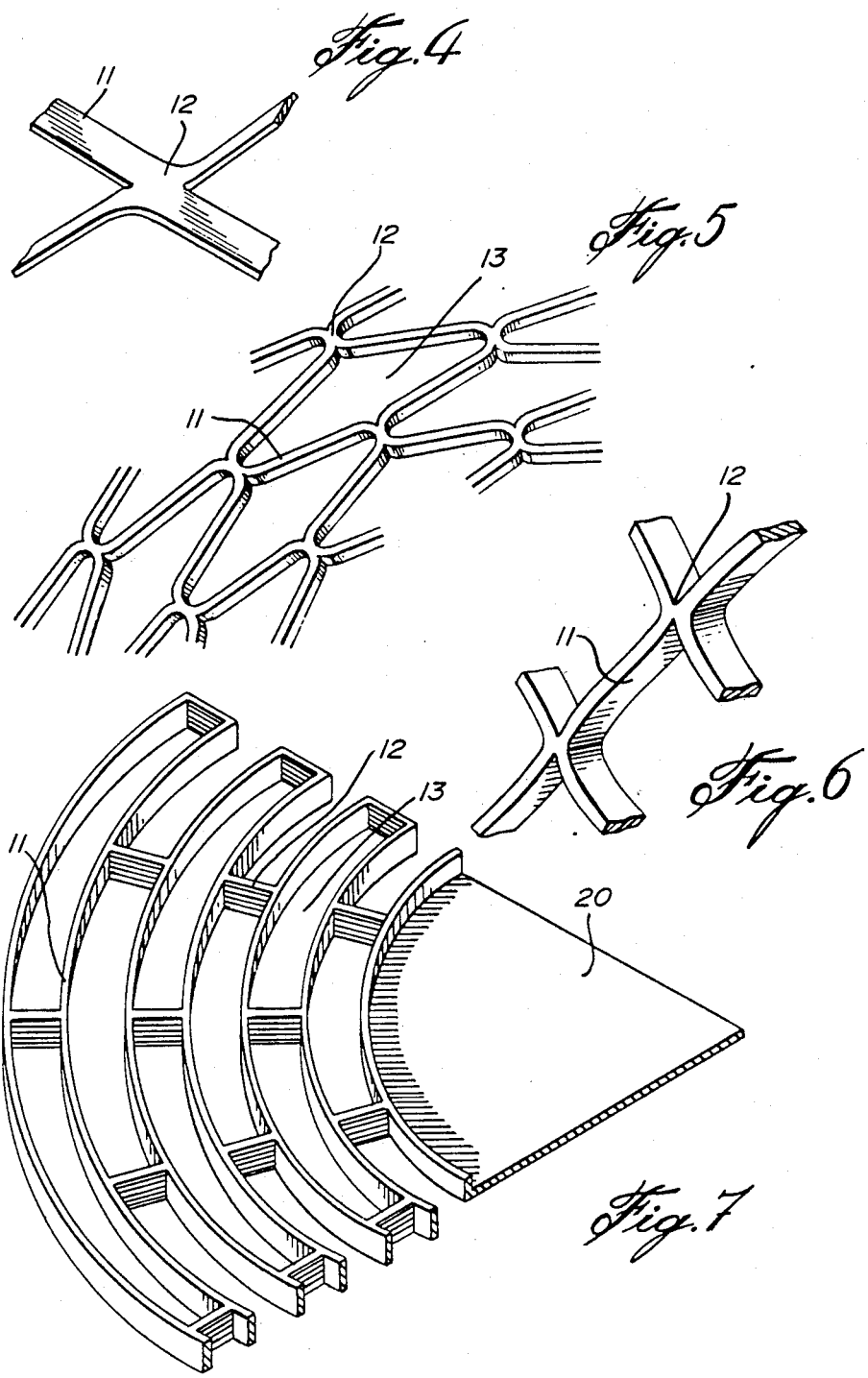

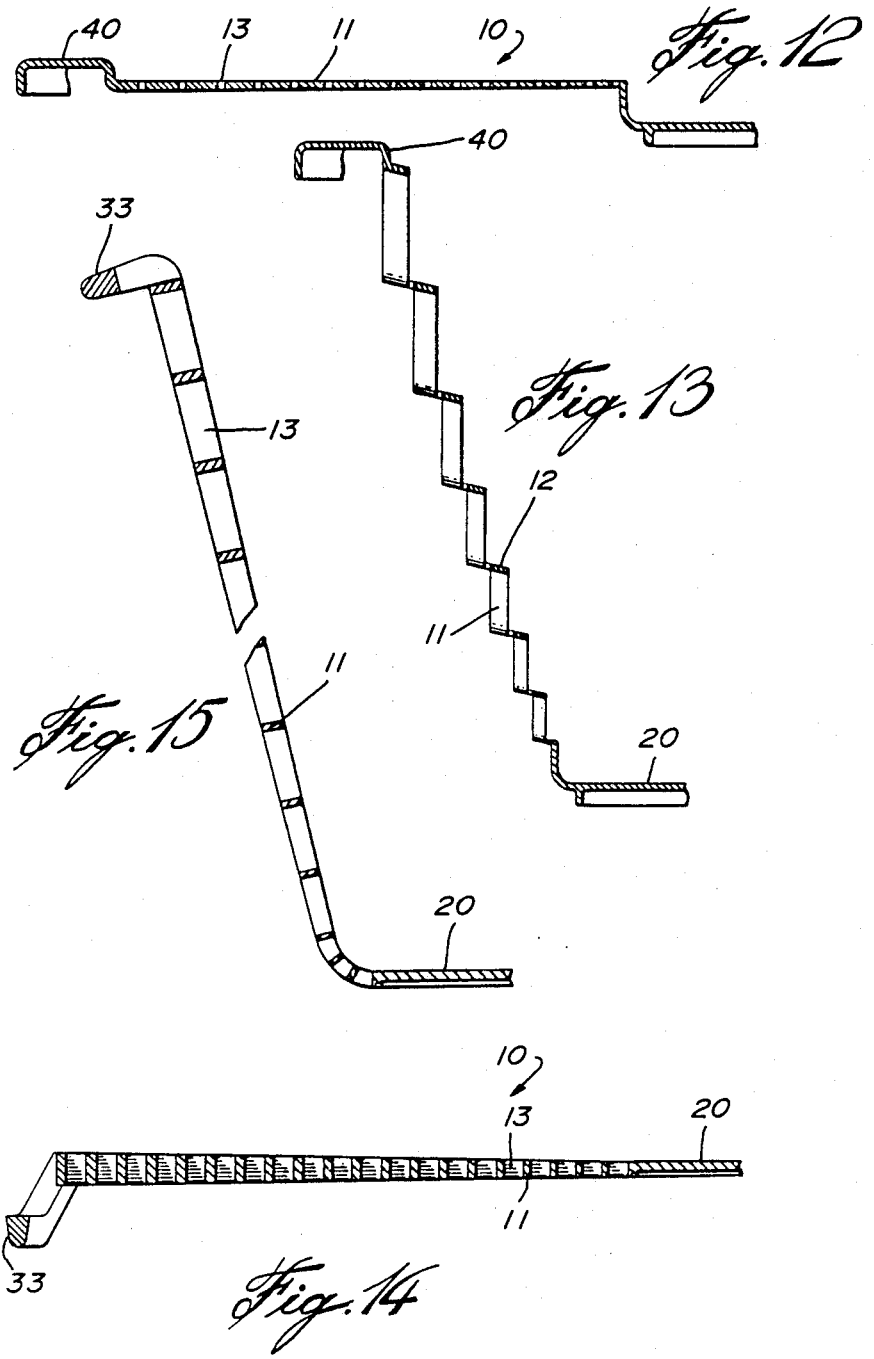

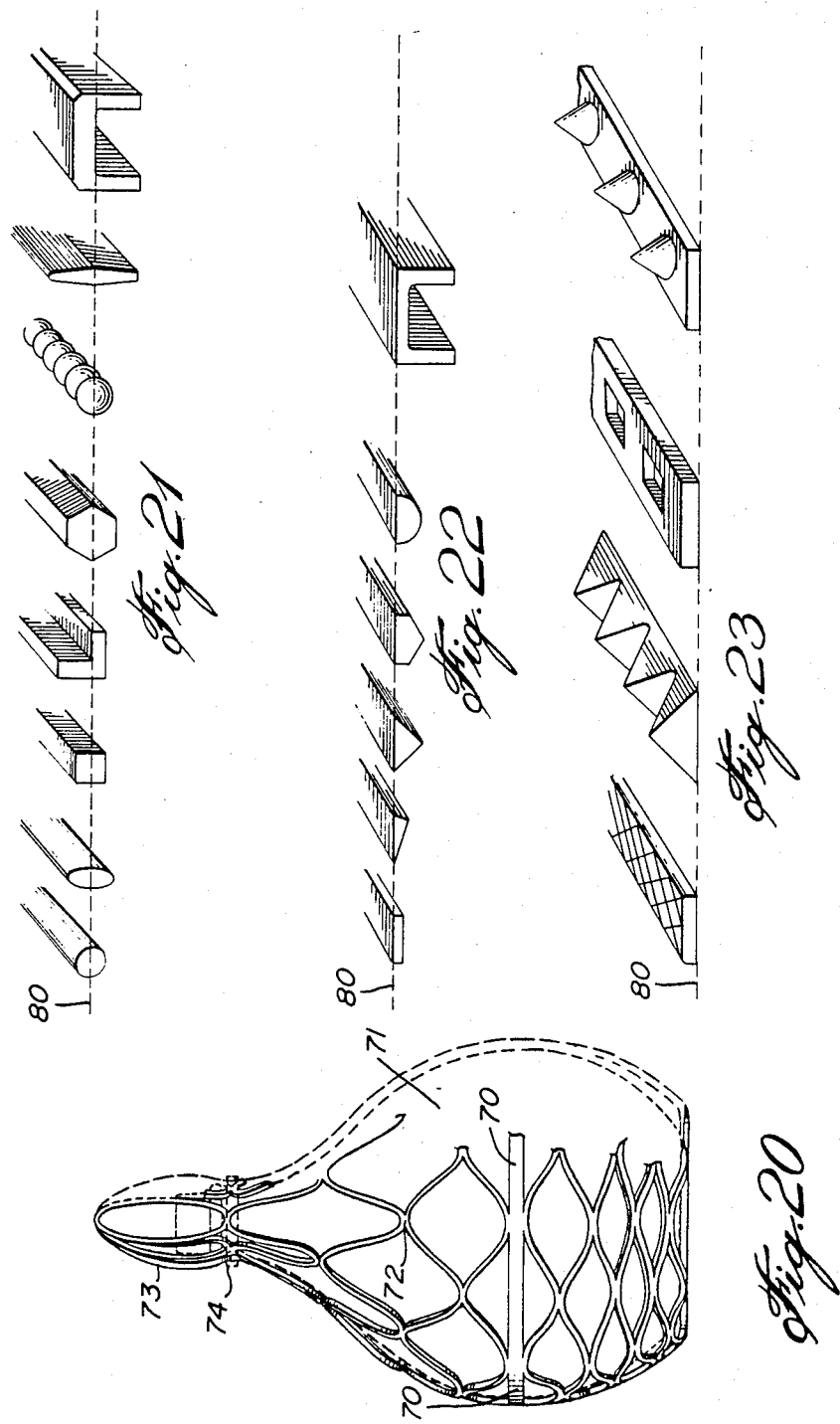

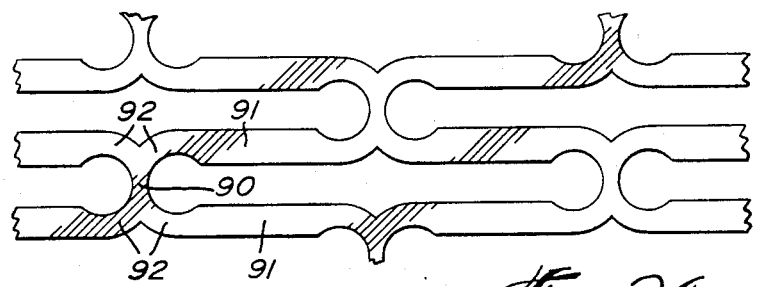
Fig. 24
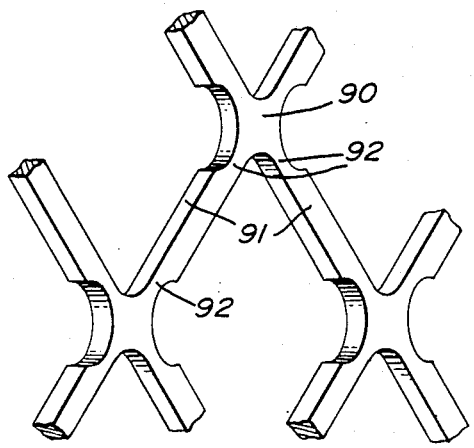
Fig. 25
Fig. 26
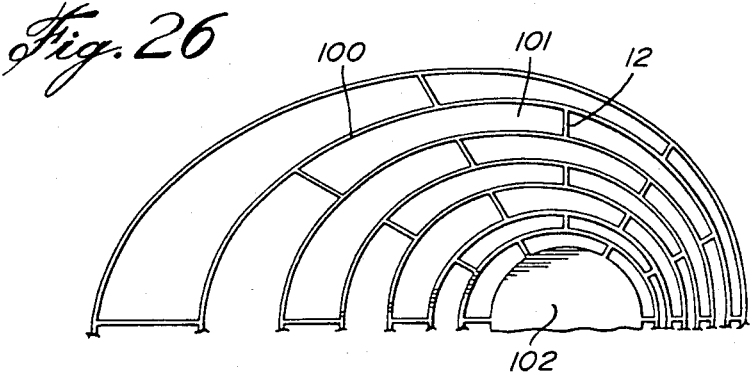

METHOD OF FORMING A NET-LIKE STRUCTURE

CROSS-REFERENCE TO RELATED APPLICATIONS

This application is a continuation-in-part of U.S. application Ser. No. 357,721, filed Mar. 12, 1982, now abandoned which is a continuation-in-part of U.S. application Ser. No. 250,863, filed Apr. 3, 1981, now abandoned.

BACKGROUND OF THE INVENTION

1. Field of the Invention

This invention relates to a method of forming a three-dimensional net-like structure from a material such as a suitable synthetic polymer or a suitable malleable metal. The synthetic polymers include thermoplastic and thermosetting resins and compounds of the resins with or without additives provided they may be formed in a plastic state.

2. Description of the Prior Art

Net-like structures are used for baskets, sacks, cages, and the like. In some cases, they are made from an expanded mesh, wherein slits are cut or stamped form a mesh. Such methods are limited by available sheet stock and have additional production costs of handling the sheets in the storage and cutting rooms, plus the costs of die cutting. The products of such methods are closely related to the paper cutting art of origami but share the inherent problems of low tear strength at the corners of the slits when the pattern is expanded. Furthermore, cutting or stamping out a pattern in a flat disc does not allow one to shape the strands nor to design the strand joints for expansion.

One method of making a net-like structure, such as a basket, from a synthetic polymer material, is to use three-dimensional molds or dies and injection mold or cast the basket. However, three-dimensional molds or dies are very costly to manufacture because they have complex parting planes, and these types of molds or dies have a considerable mass of material which has to be moved backwards and forwards at every forming stroke. Hence the energy requirements for such a process are high. There are also a number of limitations in the depth of the basket and in the shape of the strands and the pattern of strands and strand joints to allow the molds or the dies to part, otherwise the basket cannot be released.

SUMMARY OF THE INVENTION

A method in accordance with my invention comprises forming a three-dimensional structure from a substantially planar web having an expandable pattern of a plurality of relatively rigid strands merging at strand joints and defining openings therebetween. The planar web includes a central portion and an exterior portion surrounding the central portion. A point on the strand is selected and an imaginary bending axis passes through the point. The strand is weakened in the immediate area of the selected point in order to permit the strand to bend about the bending axis. The structure is then expanded by forcing the central perpendicular to the plane of the planar web whereby the strands will bend about their respective bending axes at the weakened areas surrounding each selected point, such that the expansion of the structure occurs without stretching the strands.

The term weakened as used herein means less rigid. The strands and strand joints are made relatively rigid, but for the purposes of expansion the strand or joint at the point of bending is weakened in the sense of making that area surrounding the point more flexible.

For instance, the strand may be temporarily weakened by heating this area. However, once expanded and set it will have regained its relative rigidity. The strand may also be pinched, if it is made out of plastics material and the reduced area simultaneously stretched such that although the "weakened" area is more flexible it has greater tensile strength due to molecular orientation.

The term "cast" or "casting" as used herein means (as set out in McGraw-Hill Dictionary of Scientific and Technical Terms) "To form a liquid or plastic substance into a fixed shape by letting it cool in the mold" or at least to be partially set in the mold.

I have found further that by casting a planar web from a suitable material in the plastic state, I can provide an expandable pattern of strands and strand joints with apertures therebetween, wherein the strand joints are designed for maximum strength once expanded, and the shape of the strands can be selected to suit decorative or strength or rigidity requirements. This process allows me to produce a net-like structure which cannot be made even by three-dimensional molding, or any other type of molding, nor can they be made by cutting or stamping out of a flat disc of material. My three-dimensional net-like structures can be formed to shapes such as cones, cylinders, spheres, tori, cornucopia, tubes, prisms, pyramids, vaulted structures, double walled structures, etc.

If the strands are cast in the planar web having a dimension perpendicular to the plane of the web greater than the dimension of the strand in the plane of the planar web, the expanded three-dimensional net structure will have a relatively smooth outer surface, while if the strands are designed such that the thickness or dimension perpendicular to the plane of the web, the exterior finish of the three-dimensional net-like structure will have a ripple effect.

Another advantage of my method of casting a planar web is that I can ensure that strand joints are thicker at their center, having a larger cross-section and thus more material than the strands. This allows expansion of the planar web to the three-dimensional shape with the strands set, but the center of the strand joints still in plastic state, thus the final heat setting of the strand joints occurs with the web in the expanded configuration. This allows the web to be heat set in the expanded configuration. I can also the three-dimensional net-like structure to be collapsed to the planar web form for ease of shipping when empty.

The expandable pattern can be made in a number of different designs depending upon the requirements. Patterns may be in the form of spiral strands, concentric circles or hoops, vaulting design, concentric perimeters with parallel lines, round, oval or polygonal in shape.

The pattern may be formed so that apertures at the exterior of the web are greater than those at the interior, and changes may be made in the pattern Some patterns have solid hoops and may be expanded only in a tapered configuration, increasing in size from the center. Other patterns have interrupted hoops and are limited to form cylindrical articles. Yet others may be expanded to spheres, cornucopias, toris, vaulted structures or other configurations. The pattern has a number of strands which may have varying widths and thicknesses along the length of the strand. Strand joints are provided, formed in a flat plane which expanded. The apertures in the pattern may be of varying shapes.

The planar web can be dimensioned to suit particular requirements when expanded, such as loading, mesh size, basket shape, dimensions, etc. The web can be expanded into a great variety of shapes. This 1 expanding step may be carried out cold if a hinge is formed by reducing the thickness of the strand in a localized area at a given point such that the strand will bend about an axis through the point if the material has cold working properties, or in the case of a synthetic polymer, may be heated to a temperature which destroys the material's heat memory so it retains its three-dimensional shape. Uses of the three-dimensional net-like structures are many and varied; examples include lampshades, Christmas decors, warning cones, macrame frames for handicrafts, bushel baskets, fruit baskets, vegetable nets with the top edges having drawstrings or ties, salad wrappers, nets for fishing and submarine farming, protective mesh for bottles and flasks, shipping containers, protective nets for plant roots, plant supporters, sports fishing nets, flower pot hangers, garbage baskets, laundry hampers, animal traps and cages, and carrying nets.

The material may be a suitable synthetic polymer or a metal, preferably an alloy, in the molten state.

The forming of the planar web may occur under heat and pressure, and generally comprises a process such as injection molding, compression molding, casting, web is formed by single gate, multiple gate or sequential injection molding, and includes at least one cold tip ripper which breaks up the cold tips of advancing streams of the synthetic polymer in a cavity before the streams join in the cavities to prevent a cold weld. Examples of suitable polymers include polyethylenes, high density molecular weight polyethylenes, polycarbonates, silicone rubbers, acrylics, polyvinyl chloride, nylon, polypropylene, urethanes, fluoroplastics and polyesters or copolyesters. Other suitable polymers may also be used. Additives may be included with the polymers as desired. Small batches of material may be prepared for specific customer orders. Suitable metals include alloys of copper, lead, zinc, nickel, aluminum, gold and silver. Certain types of steel may also be suitable.

The strand joints are preferably designed for maximum strength after expansion. These joints may be flexible hinge-type joints to allow flexing when the planar web is expanded, or they may be in the form of nodes having more material than the strands and the expanding step occurring while at least some of the material in the nodes is still in the plastic state. In the node type strand joint, the cross-section of the strand may increase towards the node.

BRIEF DESCRIPTION OF THE DRAWINGS

Having thus generally described the nature of the invention, reference will now be made to the accompanying drawings, showing by way of illustration, a preferred embodiment thereof, and in which:

FIG. 4 is an isometric view of an expanded strand joint of the planar web shown in FIG. 3;

FIG. 5 is an isometric view of another design of pattern in the expanded condition;

FIG. 6 is an isometric view of two strand joints from the pattern of FIG. 5;

FIG. 7 is an isometric view of a sector of a planar web having a pattern thereon according to another embodiment of the invention;

FIGS. 12 and 13 are cross-sectional views through web in the planar and expanded conditions;

FIGS. 14 and 15 are cross-sectional views through another web in the planar and expanded conditions;

FIG. 20 is an isometric view of a net-like structure around a flask;

FIGS. 21-23 are isometric views showing different strand configurations;

FIGS. 24 and 25 are views of hinged-type strand joints in the planar and expanded conditions;

FIGS. 26 and 27 are views of another pattern on a web in the planar and expanded conditions forming a cornucopia shape;

DESCRIPTION OF THE PREFERRED EMBODIMENTS

Figure 1:
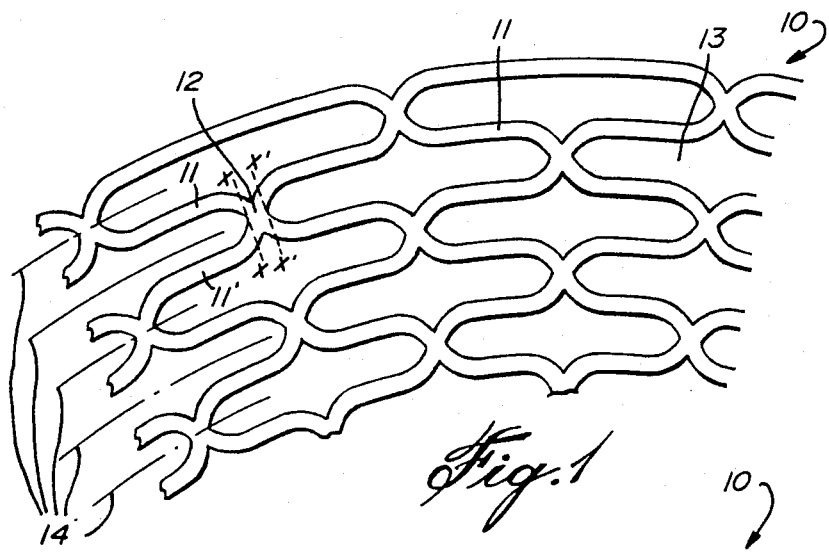
FIG. 1 is a plan view showing part of one pattern for a planar web.

The planar web is formed from a suitable material in the plastic state. In one embodiment, the material is a synthetic polymer, preferably thermoplastic or thermosetting resin. The majority of materials are a plastic state suitable for forming. The forming is by any of the known types of plastic processes such as injection molding or compression molding, casting in a mold, forging between flat dies, or calendering between engraved calender rolls. In all cases, the parting wherein a vacuum is applied to release entrapped gases from the material into the mold before setting or curing occurs. After forming into a planar web, the material must be sufficiently malleable or flexible to be able to expand into the three-dimensional shape. Polyethylenes, high density molecular weight polyethylenes, polycarbonates, silicone rubbers, acrylics, polyvinyl chloride, nylon, polypropylene, urethane, fluoroplastics, and polyesters or copolyesters are all examples of suitable materials, although all must have sufficient plasticizer present so the material is not brittle.

Metals may be die cast, forged, or open cast. Jewelry may be formed of silver or gold.

In one embodiment, the pattern is formed in the planar web with strand joints having a greater cross-section and thus more material in them than the strands. With more material in the strand joints, the cooling or hardening of the material in the planar web after forming takes longer for the strand joints than for the strand. The planar web may be expanded to the expanded condition before the material in the strand joints has hardened such that the strands are bent during the expansion around the joints. The strand joints are then allowed to cool in the expanded condition and thus they are not under stress and provide the maximum strength in the expanded condition.

In the forming step, the planar web as it is produced has a substantially flat parting plane, whether the forming takes place by molding, casting, forging or calendering. This substantially flat parting plane reduces the costs of dies and molds. In some cases, one of the two halves of the dies or molds may be completely flat, and the shape of the strands and strand joints is formed in only one half of the dies or molds. In another case, both halves of the dies or the dies or molds. The flat parting plane generally passes through the pattern of strands and strand joints in this configuration. Injection molding is made easier by having one or more cold tip rippers positioned strategically in the molds so that as the streams of material in a plastic state pass along the cavities in the mold, the hardened advancing tip of the advancing material is broken or ripped by the blade or ripper releasing the hot plastic material underneath; thus when the streams join, cold welds do not occur in the strands or strand joints. Specific compounding of batches of material is possible even in small quantities. Color and additives can be changed from one batch to another; furthermore, special additives may be included as required. In some cases, the material may be more rigid and have a high tensile strength. In the forming step wherein the planar web is made, the material is in a plastic state sufficient for it to be formed into an expandable pattern.

Another embodiment of the process includes casting the material in a plastic state into an open mold. The material is allowed to harden and is then removed.

The planar web is expanded either manually or by means of a mechanical pusher or similar. The exterior of the web is held and the interior is pushed in a direction substantially perpendicular to the planar web. A second forming step may be added to further contract a section of the axially expanded shape into inverted shapes and configurations. Contracting the exterior of a disc to a completely closed top is useful for sealing a receptacle. The maximum extent of expansion is dependent upon the design of pattern and that the strands are not to be stretched. In some cases, the expanding step occurs when the web is heated so that it retains the expanded condition when cooled. In some flexible materials, the expansion step only occurs when the net collapses to the planar condition. In another embodiment, the center of the web is held or restrained and the exterior is moved away from the center. This is particularly useful if one is filling a net-like structure. Handles on the exterior merely have to be lifted to expand the web and contain the contents.

Figure 2:
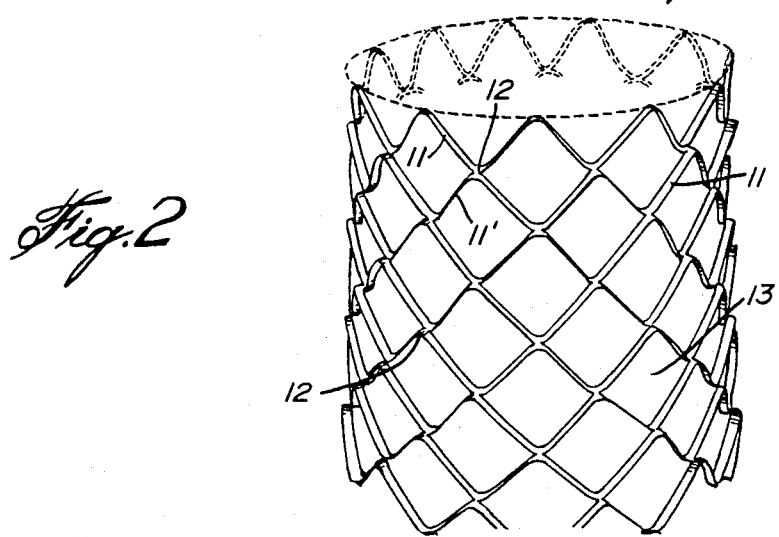
FIG. 2 is an isometric view of the planar web shown in FIG. 1 expanded into a three-dimensional net-like structure.

An example of a planar web 10 is illustrated in FIG. 1 showing the expandable pattern of strands 1 and strand joints 12 with apertures 13 therebetween. FIG. 1 illustrates the pattern in the flat or planar condition as formed. Each strand 11 is in the shape of an ogee connecting to an X-shaped strand joint 12. The bending of the strands will occur in the area of the joints as represented by the bending axis x and x'. The strands 11 are substantially perpendicular to adjacent strands 11' at the strand joints 12. The bending will occur upon expansion, once the areas along axis x and x' have been heated. As can be seen in FIG. 2, the expanded three-dimensional net-like structure is shown practically cylindrical, although the apertures 13 at the exterior of the planar web are larger than the apertures at the interior of the web. The strands 11 become substantially straight when the web is in the expanded condition. As can be seen in FIG. 1, the apertures 13 are arranged in concentric circles 14 and the strand joints 12 in every other concentric circle 14 occur at the center of the apertures 13 in intermediate circles 14 forming a type of brick and mortar configuration.

Figure 3:
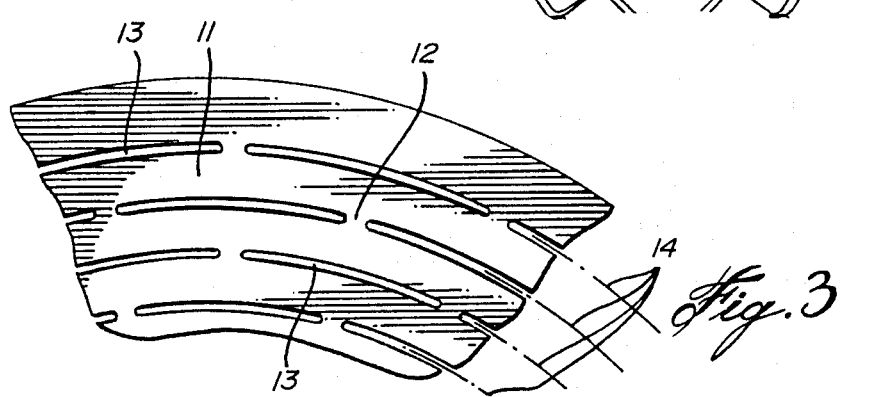
FIG. 3 is a plan view showing part of another pattern for a planar web according to the present invention.

FIGS. 3 and 4 show another expandable pattern with thin slit-like apertures 13 in concentric circles 14. The strands 11 define apertures 13 in the form of wide webs between the apertures. The radial width of the apertures 13 is considerably less than the radial width of the strands 11. Furthermore, as can be seen in FIG. 4, the radial width of the strands 11 is considerably greater than the thickness of the web; thus the strand joints 12, when in the expanded condition, are not flush with the side wall of the expanded web, but are at an angle to the side wall to give a rippled effect. FIGS. 5 and 6 illustrate a different pattern design wherein the strands 11 have a radial width considerably less than the thickness of the web. Strand joints 12 are X-shaped and as illustrated in FIG. 6, when in the expanded condition, are generally in line with the side wall of the expanded web to produce a smooth side wall. This design has a minimum increase in mesh size towards the rim.

Figure 8:
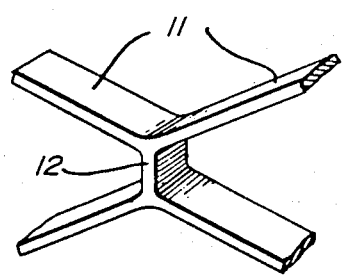
FIG. 8 is an isometric view of a strand joint from the pattern of FIG. 7 in the expanded condition.

FIGS. 7 and 8 show another configuration of an expandable pattern wherein the strand joints 12 are H-shaped. The strands 11 have a radial width considerably less than the thickness of the web and considerably less than the radial width of the apertures 13. An interior base 20 is provided having a thickness less than the thickness of the patterned portion of the web.

Figure 9:
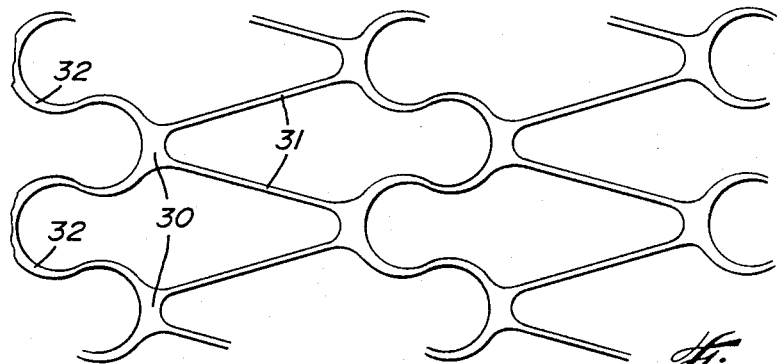
FIG. 9 is a plan view showing another pattern of the present invention in a planar web.
Figure 10:
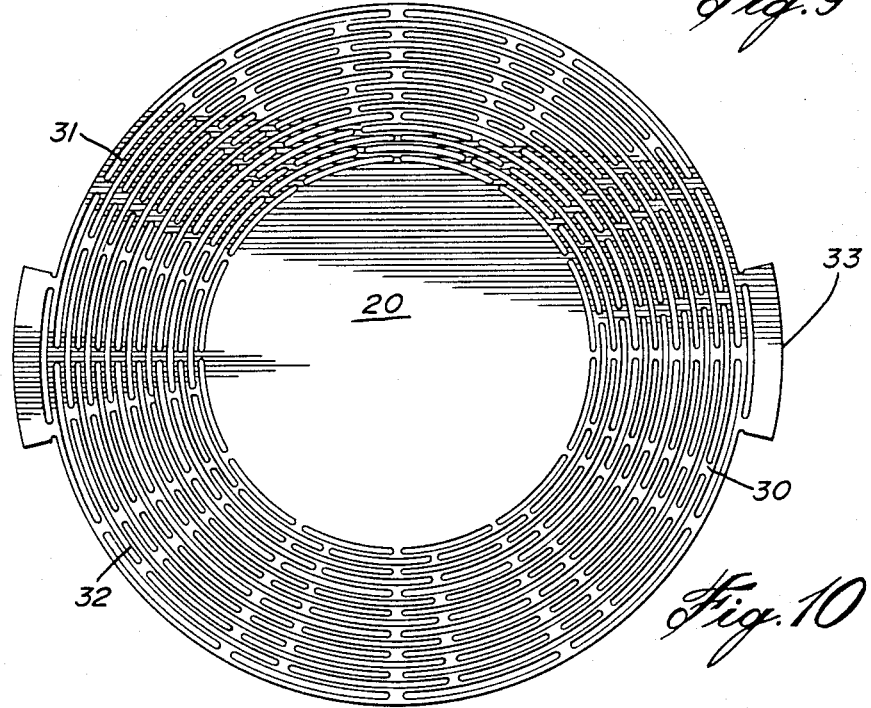
FIG. 10 is a plan view of a complete planar web having the pattern shown in FIG. 9.
Figure 11:
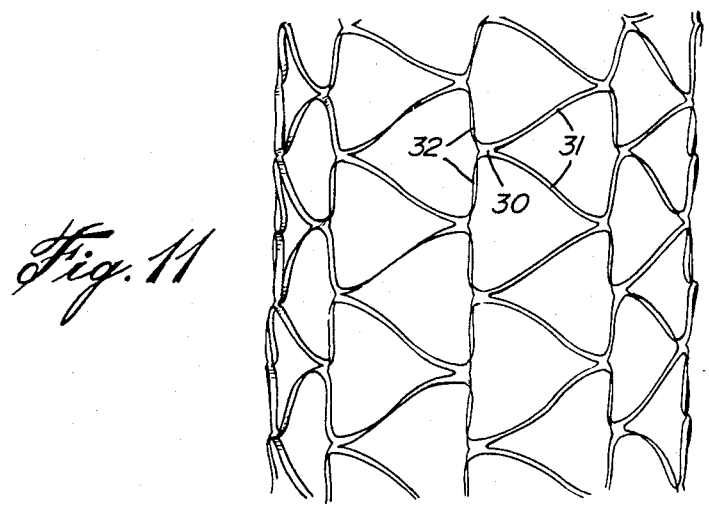
FIG. 11 is an elevational view showing the pattern of FIG. 9 in the expanded condition.

A different configuration of an expandable pattern is shown in FIGS. 9, 10 and 11, wherein the strand joints are in the form of nodes 30 having a greater cross-section and more material than the strands. As seen in FIG. 9, long strands 31 extend from a node 30 in one concentric circle to nodes 30 in adjacent circles above and below the first node 30. Strands 32 are in the form of an ogee or sinuous curve when in the planar condition and extend in a generally radial line from node to node 30 between the long strands 31. The complete pattern of the planar web is illustrated in FIG. 10, the ogee strands 32 forming a sinuous curved radial sector with the long strands 31 being in substantially circumferential lines between the nodes 30. Handles 33 are provided at the outside edges of the web for the basket or net-like structure. FIG. 11 shows the web in the expanded condition. The ogee strands 32 straighten and provide a limit to the maximum expansion that can be obtained with this pattern.

FIGS. 12 and 13 show an expandable pattern similar to that shown in FIGS. 3 and 4, wherein the apertures 13 have a radial width less than the radial width of the strands 11 and the thickness of the web is considerably less than the radial width of the strands 11. When expanded as shown in FIG. 13, the side wall has a rippled effect. A rim 40 is illustrated at the outer edge of the web and a dish-shaped base 20 is provided in the center of the web. The rim 40 and the base 20 are considered separate from the planar web, and may not be planar, but can be dish-shaped or any three-dimensional shape as required. The thickness of the web for the portion of the pattern is greater at the extremity of the web and tapers slowly inwards towards the center. FIGS. 14 and 15 illustrate an example of an expandable pattern similar to that shown in FIGS. 5 and 6. The radial width of the strands 11 is considerably less than the radial width of the apertures 13, and also less than the thickness of the web. When the web is in the expanded condition, the side wall is smooth as the strand joints 12 remain flat. Handles 33 are provided at the exterior of the web and a flat interior base 20 is provided in the center of the web. The thickness of the web for the portion of the pattern is greater at the extremity of the web and tapers slowly inwards towards the center.

Figure 16:
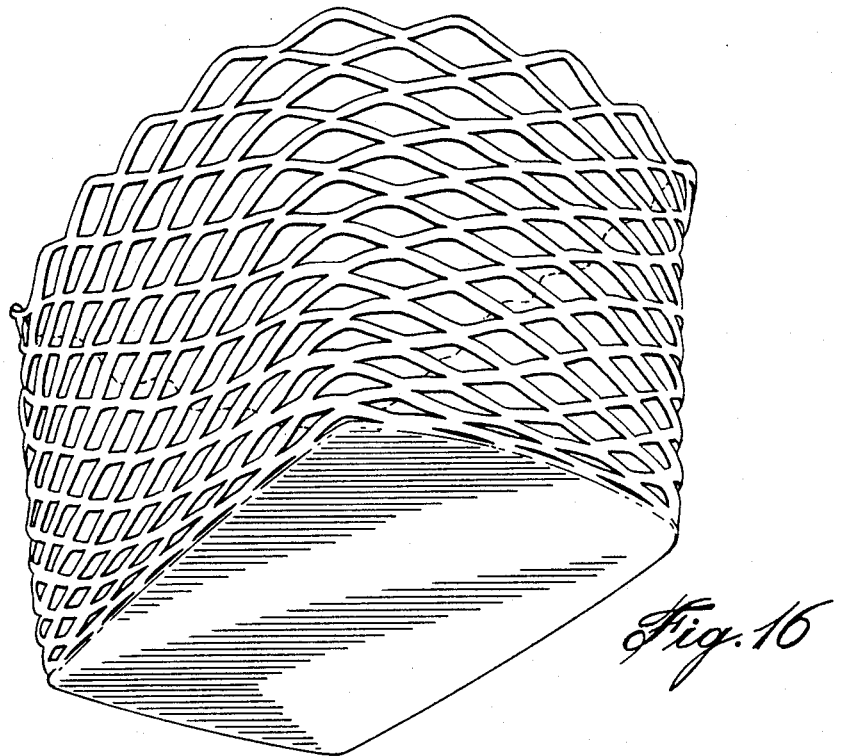
FIG. 16 is an isometric view of a net-like structure in the form of a rectangular shaped basket.
Figure 17:
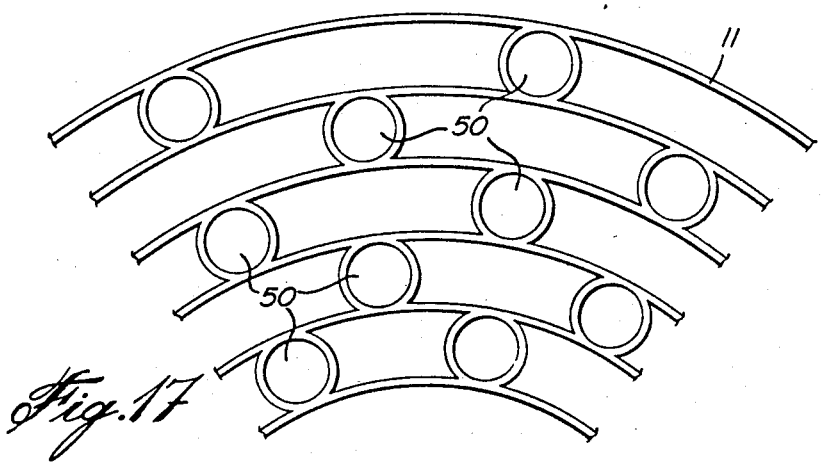
FIG. 17 is a plan view showing part of another pattern on a planar web.

A basket is illustrated in FIG. 16 which has a substantially rectangular base. The corners are rounded and the pattern is designed to extend around the corners. Another design pattern is illustrated in FIG. 17 wherein the strand joints 50 are in the form of rings with holes in the center thereof. The strands 11 are formed in concentric circles.

Figure 18:
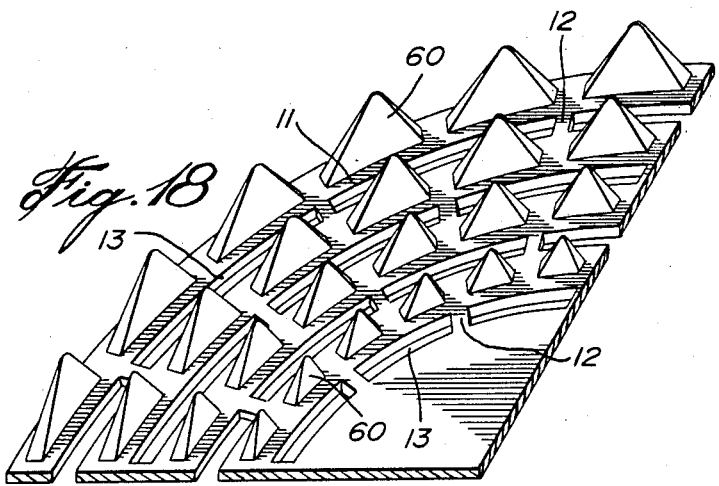
FIG. 18 is an isometric view showing part of another pattern on a planar web having raised fins thereon.
Figure 19:
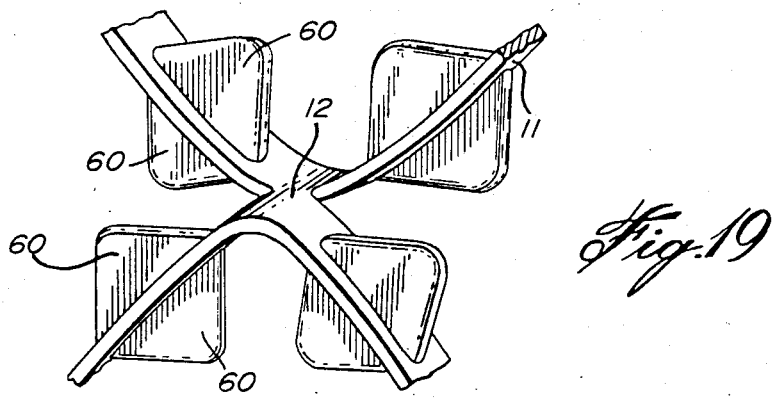
FIG. 19 is an isometric view showing an expanded strand joint in the pattern of FIG. 18.

FIGS. 18 and 19 illustrate another embodiment of a planar web, the expandable pattern being somewhat similar to that shown in FIG. 3, but including the addition of protrusions 60 extending from both surfaces of the planar web on the strands 11 between the apertures 13. The protrusions 60 are formed substantially perpendicular to the flat parting plane. FIG. 19 illustrates the pattern in the expanded condition showing the protrusions 60 in the shape of triangular protrusions which extend across apertures 13 between the strands 11. The protrusions 60 in this configuration extend in line with the side wall of the net-like structure. When protrusions 60 are incorporated in patterns such as those shown in FIGS. 5 and 6, they extend substantially perpendicular to the side wall.

FIG. 20 illustrates a bottle or flask having a protective net cover surrounding the article. A single solid hoop 70 is left at the center or largest diameter of the bottle 71. As can be seen, the vertical distance between the strand joints 72 increases towards the top of the bottle 71 as the outside diameter is reduced. Loops 73 are provided at the top of the bottle 71 which have hook and eye connectors 74 to hold the net around the bottle 71. The material of construction may be a foamed plastic to provide a cushion for the flask or bottle. Protrusions may also be provided to cushion the bottle 71. Other shapes may be formed such that after the expansion step, the edge of the pattern is inverted and turned in to form an enclosed structure or a contracted enclosure. Such shapes as spheres, toris, double-walled structures and hour-glass structures are but a few of the many possible configurations.

Examples of the cross-sectional shape of strands are illustrated in FIGS. 21-23. The flat parting plane 80 shown in the Figures represents the separating plane of the dies or molds. FIG. 21 provides for the dies or molds to have indentations made on each half of the die or mold. In FIG. 22, the grooved indentations are made only on one half of the die or mold, and in FIG. 23, the relief indentations are made on one half of the die or mold. The shape of the strands shown in FIGS. 22 and 23 may be made by open casting with no top half to the mold, or alternatively, if injection molding is to be used to form the web, one half of the die has a completely flat surface. Whereas these examples illustrate the strands having a substantially uniform cross-section along the length, it will be appreciated that the cross-section may be varied along the length of the strand between strand joints. This choice of shape for the strands allows the net-like structure to be formed with decorative and useful shapes and configurations, many of them impossible to make by any known technique or with any existing equipment. Furthermore, the strands themselves can be finished with a smooth or textured finish as preferred for the particular article.

Examples of cross-sectional shapes of strands include square, rectangular, triangular, diamond, oval, round, key-hole, T-shaped, V-shaped, L-shaped, U-shaped, trapezium, hexagonal, octagonal, polygonal, mushroom and semi-circular. This list is in no way limiting as almost any shape that can be formed could be used.

FIGS. 24 and 25 illustrate hinge joints 90 between strands 91. The joints 90 provide thin cross-section portions 92 which are thinner than the strands 91; thus as the pattern expands, bending occurs at the thinner portions 92, as can be seen in FIG. 25, and the strands 91 remain straight. This construction of strand joint 90 is referred to as a flexible hinge joint, because the flexing occurs at the hinge rather than in the strand itself.

Figure 27:
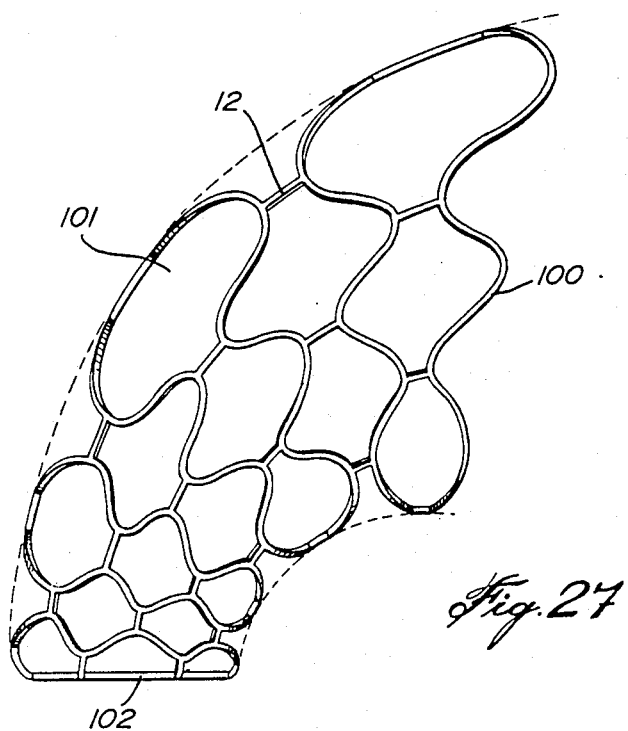

FIGS. 26 and 27 illustrate a planar web with increasing strand length to one side and a series of off-set rings 100 with apertures 101 which are wider on one side of the web than on the other. A center disc 102 is offset in the planar web and expansion of the planar web produces a cornucopia shape as illustrated in FIG. 27. Such a shape may also be made by attaching at least one solid strip or stave to a web such as that shown in FIG. 1 used as a curved cage display shape or elbow chute.

Figure 28:
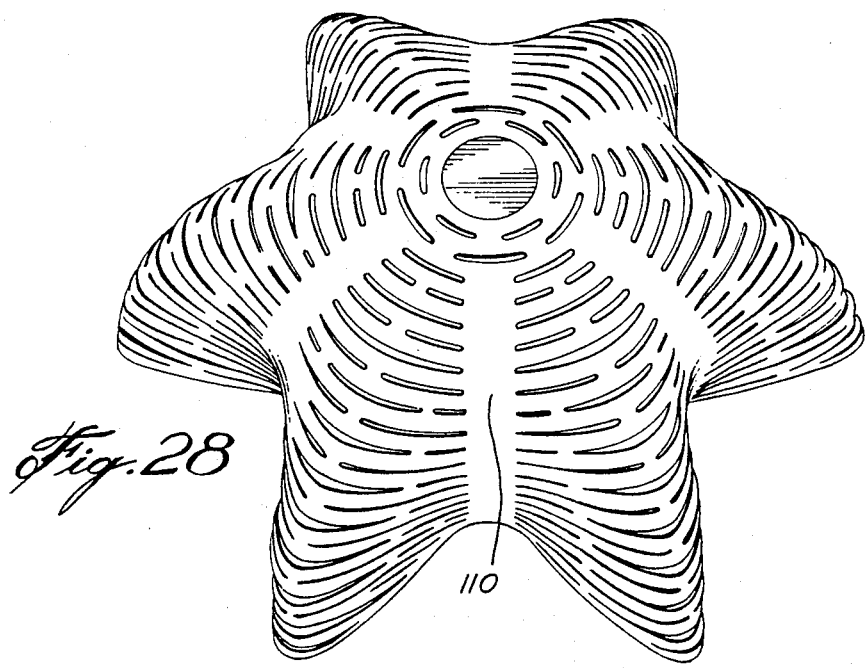
FIG. 28 is an isometric view of a further pattern on a web in the expanded condition having vaults and non expandable radial groin strips.
Figure 29:
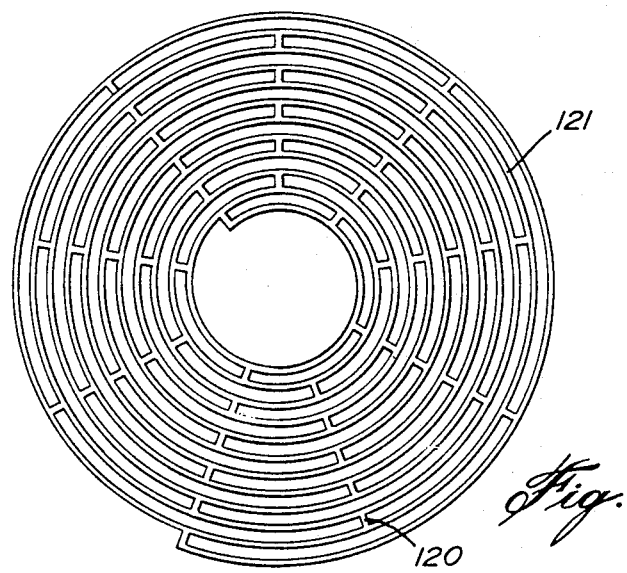
FIG. 29 is a plan view of a further embodiment of a pattern in a planar web formed in a spiral.
Figure 30:
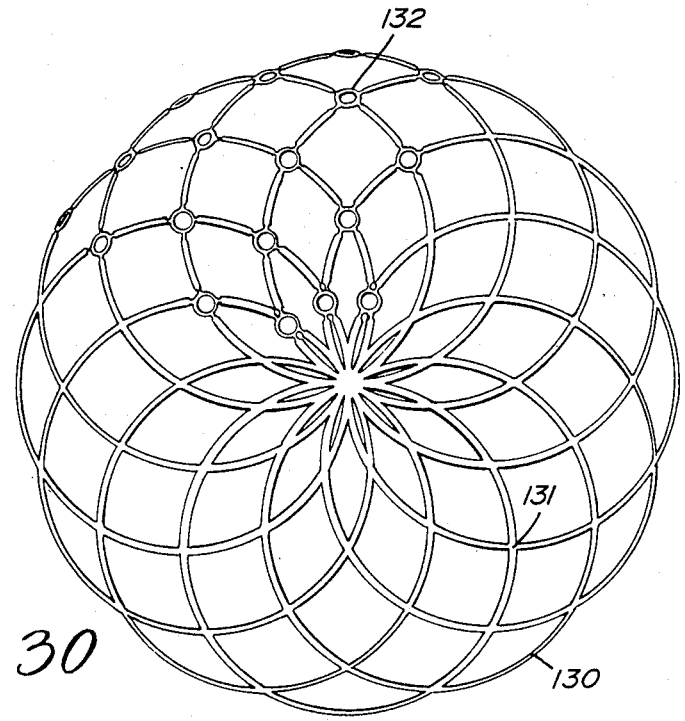
FIG. 30 is a plan view of a further embodiment of a pattern in a planar web formed in a series of rings.
Figure 31:
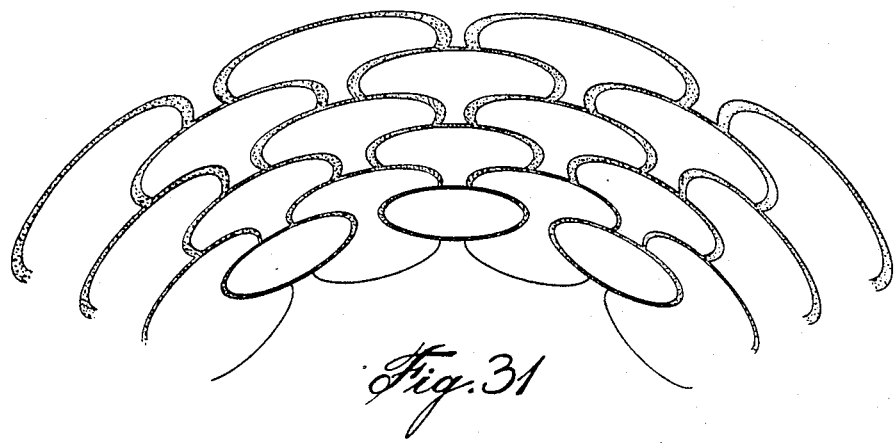
FIG. 31 is a plan view of a portion of a pattern in a web having a fish scale design.

FIG. 28 illustrates an expanded pattern which has a series of radial solid strips or staves 110 spaced at even distances apart around the circumference of the planar web, thus providing a vaulted expanded pattern. Such a pattern may be formed either by forming the staves 110 at the same time of molding or casting the pattern, or alternatively, they may be added after the pattern on the planar web has been formed. Vaulted structures may also be made from webs having a variation of mesh size in radial rows at several radian locations. In FIG. 29, the expandable pattern on the planar web is a spiral with radial connections 120 located in every other coil 121 of the spiral. A first series of radial connections 120 in a radial line connects at strand joints across every other coil or winding 121, and a second series of radial connections also in a radial line is spaced between the first series of radial connections 120 and connects across windings not joined in the first series of radial connections 120. In FIG. 30, the expandable pattern comprises a plurality of overlapping rings 130 with strand joints 131 at the points of overlap. The overlapping rings 130 are equispaced apart about a circle and joined at the center of the circle. This design has the same length of strand throughout the pattern. Special hinge joints 132 are illustrated in the top portion of the Figure to allow for flexing when the pattern is expanded. A fish-scale style of design is illustrated in FIG. 31.

Figure 32:
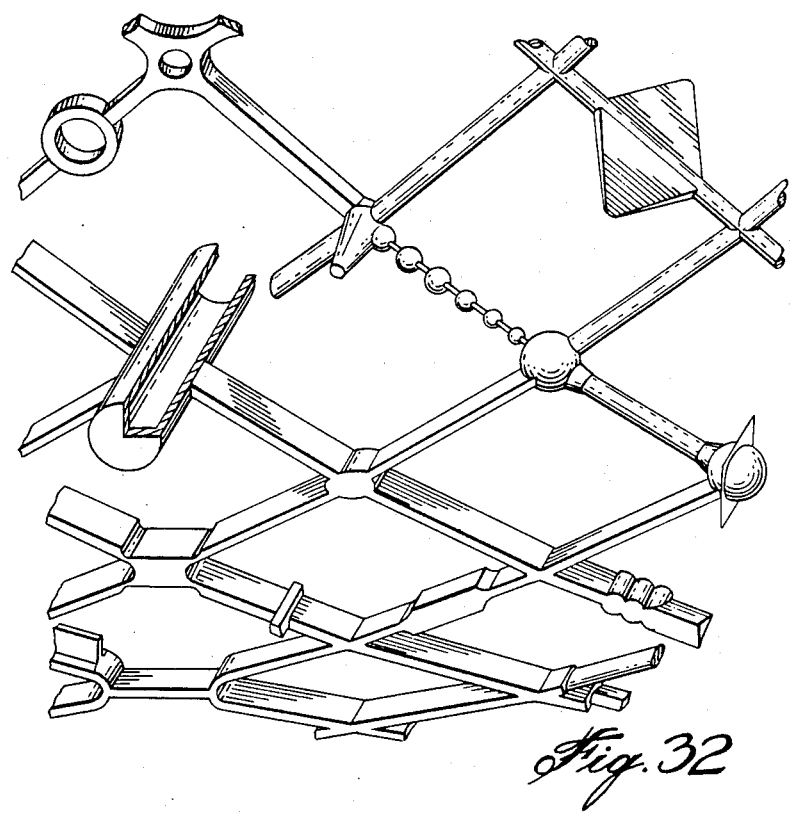
FIGS. 32 and 33 are isometric views showing different designs of strands and strand joints.
Figure 33:
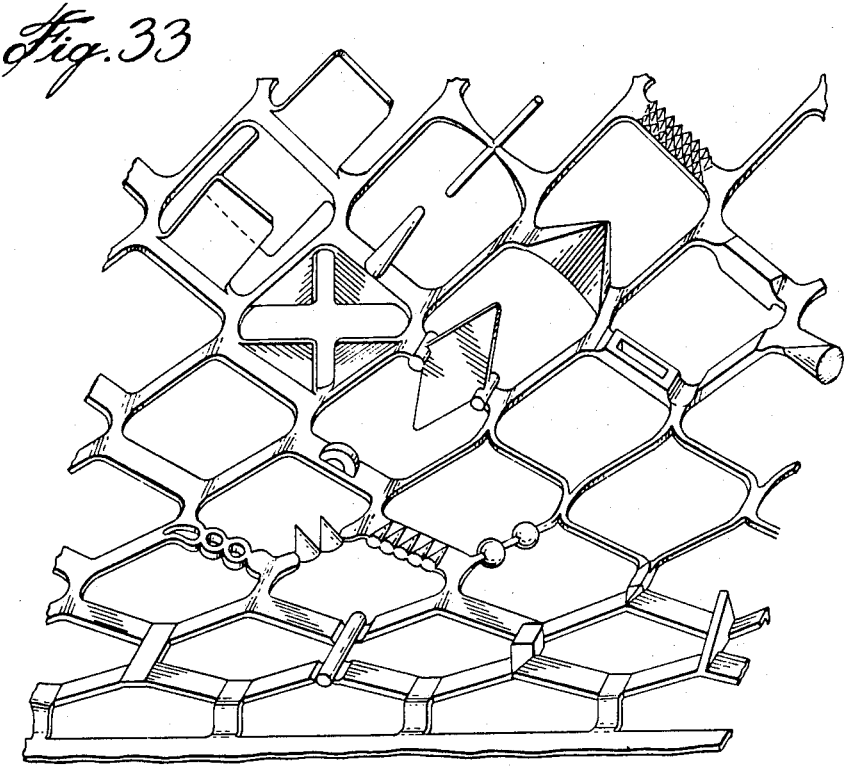

FIGS. 32 and 33 illustrate examples of strands and strand joints. FIG. 32 shows the strands having a radial width smaller than the thickness of the web, and FIG. 33 shows the strands having a radial width greater than the thickness of the web. Different types of protrusions, decorative designs, flexible joints and node type joints are all illustrated in the drawings.

Figure 34:
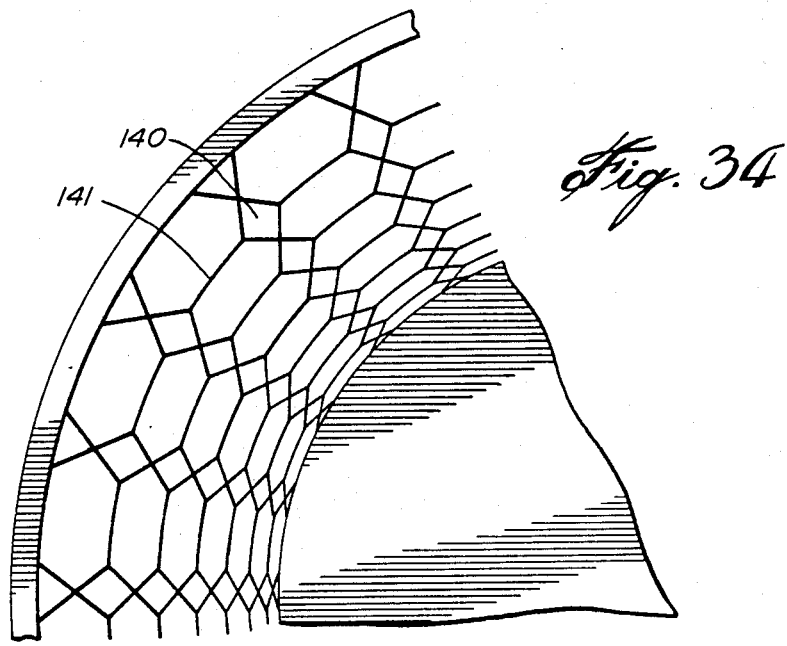
FIGS. 34, 35 and 36 are plan views of portions of further configurations of patterns in planar webs.
Figure 35:
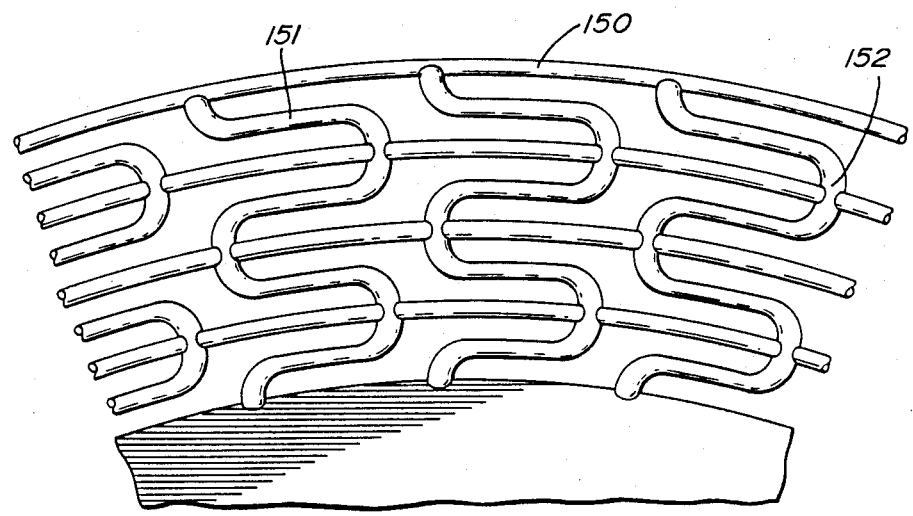

Another pattern or configuration is shown in FIG. 34, wherein the limit of expansion is restricted by a radial row of diamond-shaped patterns 140 radially extending from the center of the web. Circular strands 141 join the diamond-shaped patterns 140 together. These diamond-shaped patterns 140 restrict the expansion of the web and thus control the amount of opening that can occur. In heat set materials they become staves and such structures are not collapsible. FIG. 35 illustrates a pattern with a series of hoops 150 concentric about a center disc 20. Ogee strands 151 are arranged in opposite sloping directions between the concentric hoops 150 and strand joints 152 are provided with the ogee strands 151 connected substantially perpendicular to the hoops 150. When the pattern is expanded, the hoops 150 cannot change in diameter but strand 151 forms a substantially straight line between the strand joints 152 and are in line with the adjacent ogee strand 151. Such designs cannot be inverted or collapsed after being heat set in the expanded configuration.

Figure 36:
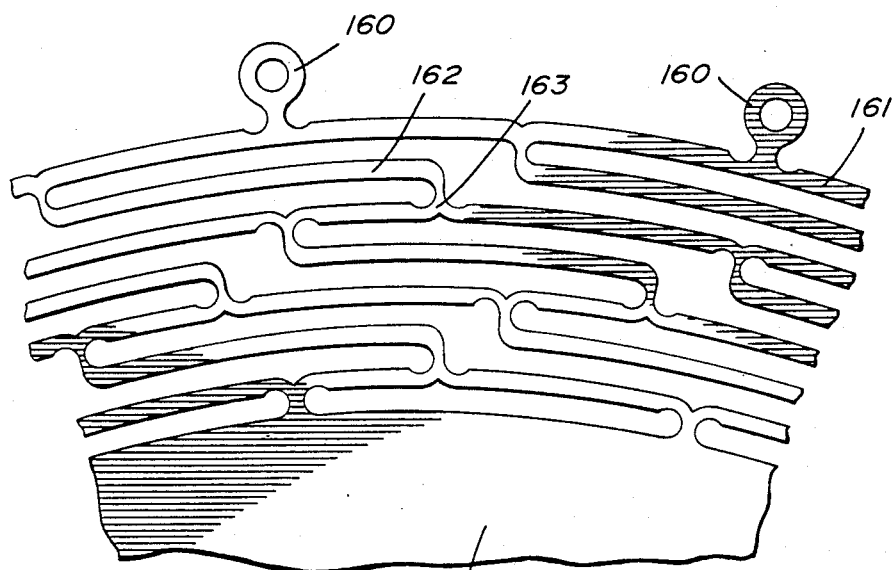

FIG. 36 shows a further embodiment of a pattern with eyelets 160. Concentric circular strands 161 are located about a center disc 20 with ogee strands 162 between the circular strands 160 and all sloped in the same direction. Flexible hinge type strand joints 163 are positioned between the ogee strands 162 and the circular strands 161, with the strand joints 163 located in radial rows between every other circular strand 161. In such a configuration, expansion of the circular strands 161 cause them to bend at the strand joints 163 and are pulled out of shape unlike the pattern illustrated in FIG. 35. The pattern appears as a honeycomb design in the expanded configuration.

The design of the pattern, design of the shape of the strands, design of the outside shape of the planar web is all a matter of selection, provided in each case the pattern made can be expanded into a three-dimensional shape. Various changes may be made to the design of the pattern on the planar web without departing from the scope of the present invention, which is limited only by the following claims.

Figure 37:
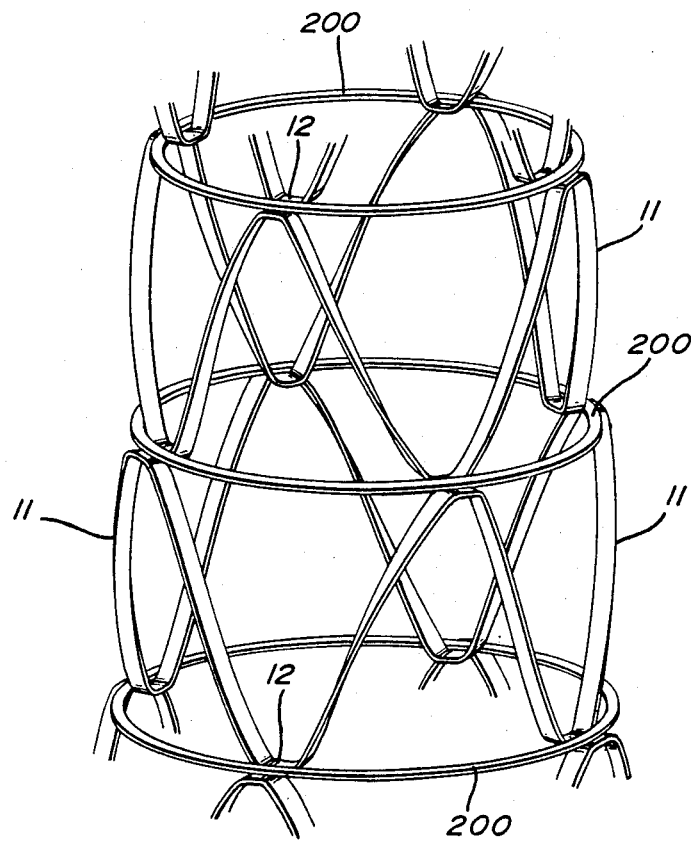
FIG. 37 is a perspective view of another embodiment of the present invention.

FIG. 37 represents an expanded structure made in accordance with the present invention which has been adapted for improved structural integrity. For instance, the embodiment of FIG. 37 could represent a light standard or other supporting structure made from a one flat web.

The expanded structure 10 includes strands 11 and strand joints 12. However, in order to maintain structural integrity of the erected device, circular staves 200 have been slipped over the structure so that they engage the periphery of the structure in the area of the joints 12. In this manner, opposed expanded strands and strand joints which would normally form a rhumbus, are now divided structurally into two opposed triangles by the stave 200. As long as the staves 200 are F FIG. 37, it is impossible to collapse the expanded structure.

The staves 200 may, of course, be replaced by devices which are integral with the structure and which might have been molded in one piece with the strand joints. For instance, tying means in the form of modified strands could be molded extending from the strand joints between the strands in the planar web such that when erected, the tying strands can be connected together and be the equivalent of the staves 200.

I claim:

1. A method of forming a three-dimensional structure comprising the steps of casting a substantially planar web from a suitable material in the plastic state, the planar web being initially cast with an expandable pattern of a plurality of non-bendable, rigid strands merging at strand joints and defining openings therebetween, the planar web including a central portion and exterior portion surrounding the pattern of strands and the central portion, selecting points on the strands near or on the strand joints, a bending axis passing through each of said points, weakening the strands in the intermediate area of the selected points to form hinges in order to permit the strands to bend about the bending axes, and expanding the structure by forcing the central portion and the exterior portions in opposite directions perpendicular to the plane of the planar web, the bending of the strands occurring about their respective bending axes at the hinges, the expansion of the structure occurring without changing the dimensions of the strands and strand joints from the dimensions thereof in the planar web, whereby a rigid, three dimensional structure with structural integrity is formed.

2. A method as defined in claim 1, wherein the planar web is at least partially solidified before the planar web is formed into a three-dimensional structure.

3. A method as defined in claim 2, wherein the material is a metal provided in a molten state.

4. A method as defined in claim 3, wherein the metal for forming the planar web is selected from the group consisting of steel, copper, lead, aluminum, zinc, gold, silver and their alloys.

5. A method as defined in claim 1, wherein the step of weakening the strand is formed by providing a relatively smaller cross-section of strand in said area such that the dimension of reduced cross-section is at right angles to the bending axis of the strand.

6. A method as defined in claim 1, wherein the step of weakening the strand or strand joint includes applying heat to said areas in order to render said areas partially plastic and then expanding the structure while the weakened areas are in a partially plastic state by bending the strands about the bending axis respectively and allowing the weakened areas to set in the expanded state.

7. A method as defined in claim 1, wherein the material is a synthetic polymer and is heated to a temperature which destroys plastic memory recovery while expanded so that the once expanded structure retains its shape.

8. A method as defined in claim 7, wherein the synthetic polymer for forming the planar web is selected from the group consisting of polyethylenes, polycarbonates, silicone rubbers, acrylics, polyvinylchloride, nylon, polypropylene, urethanes, fluoroplastics and polyesters or copolyesters.

9. A method as defined in claim 8, wherein casting the planar web occurs under heat and pressure.

10. A method as defined in claim 1, wherein the material is a synthetic polymer.

11. A method as defined in claim 1, wherein the planar web is cast using a process of molding.

12. A method as defined in claim 1, wherein a planar web having a central portion and an exterior portion surrounding the central portion and a pattern of strands forming a plurality of concentric circles interrupted by apertures in the web, is formed from the steps of injection molding, a material in plastic state, allowing the planar web to at least partially solidify, and a central portion of the planar web being devoid of openings to form a bottom, an external periphery of the planar web being devoid of apertures to form a rim such that when the planar web is expanded, an open-top receptacle is formed, and the further step of setting by way of cooling the expanded structure.

13. A method as defined in claim 1, wherein the three dimensional structure is rendered self-supporting and load bearing by providing, when the shape, continuous tying means between peripherally aligned joints.

14. A method as defined in claim 13, wherein the continuous tying means are in the form of a separate circular stave adapted to fit peripherally about the expanded structure coincident with peripherally aligned joints.

15. A method of forming a three-dimensional structure comprising the steps of casting a substantially planar web from a suitable material in the plastic state, the planar web being initially cast with an expandable pattern of a plurality of non-bendable, rigid strands merging at strand joints in the for of nodes and defining openings therebetween, the nodes having a section greater than the combined cross-section of a pair of joining strands, the planar web including a central portion and an exterior portion surrounding the pattern of strands and the central portion, during the casting step, cooling the so-formed planar web to a point in time wherein the strands are in a solidified rigid state but the greater cross-section nodes are still partially in a plastic state and expanding the structure by forcing the central portion and the exterior portions in opposite directions perpendicular to the plane of the planar web at said point in time by bending the strands at the nodes and cooling the nodes completely in the expanded shape.

* * * * *